United States Patent [19]

Elmer et al.

[11] 4,019,884
[45] Apr. 26, 1977

[54] METHOD FOR PROVIDING POROUS BROAD-BAND ANTIREFLECTIVE SURFACE LAYERS ON CHEMICALLY-DURABLE BOROSILICATE GLASSES

[75] Inventors: Thomas H. Elmer, Corning; Helen Walters, Painted Post, both of N.Y.

[73] Assignee: Corning Glass Works, Corning, N.Y.

[22] Filed: Jan. 22, 1976

[21] Appl. No.: 651,429

[52] U.S. Cl. .................................. 65/30 R; 65/31; 156/66.3
[51] Int. Cl.[2] .......................................... C03C 15/00
[58] Field of Search ................. 156/24; 65/31, 30 R

[56] References Cited
UNITED STATES PATENTS

| 2,348,704 | 5/1944 | Adams | 156/24 |
|---|---|---|---|
| 3,374,130 | 3/1968 | Junge et al. | 156/24 |
| 3,551,228 | 10/1970 | Meth | 156/24 |
| 3,616,098 | 10/1971 | Falls | 156/24 |
| 3,647,583 | 3/1972 | De Rouw | 156/24 |
| 3,785,793 | 11/1974 | Park | 65/31 |
| 3,938,974 | 2/1976 | Macedo et al. | 65/30 R |

Primary Examiner—S. Leon Bashore
Assistant Examiner—Frank W. Miga
Attorney, Agent, or Firm—Kees van der Sterre; Clinton S. Janes, Jr.; Clarence R. Patty, Jr.

[57] ABSTRACT

A method for providing broad-band antireflective surface layers on a chemically durable borosilicate glass which comprises phase-separating the glass by heat treatment at 630°–660° C., removing a siliceous surface layer from the glass, and treating the glass in an aqueous solution containing both $H^+$ ions and $F^-$ ions for a time sufficient to produce the antireflective surface layer, is described. Antireflective surface layers exhibiting reflectances as low as 0.5% throughout the wavelength range from about 0.4–2.0 microns have been produced.

6 Claims, 2 Drawing Figures

METHOD FOR PROVIDING POROUS BROAD-BAND ANTIREFLECTIVE SURFACE LAYERS ON CHEMICALLY-DURABLE BOROSILICATE GLASSES

CROSS-REFERENCE TO RELATED APPLICATION

This application is related to copending application Ser. No. 651,416 entitled "Antireflective Layers on Phase Separated Glass," of M. J. Minot et al., concurrently filed and commonly assigned herewith.

BACKGROUND OF THE INVENTION

The present invention relates to the problem of providing antireflective surface layers or coatings on glass, and is specifically concerned with methods for providing stable antireflective surface layers on chemically-durable borosilicate glasses.

An inexpensive method of providing an antireflective film or layer on glass could be used in the production of non-glare glass for picture frames, television screens, eyeglasses and lenses, windshields, instrument panels, display windows and the like. One area of recent interest, requiring a method of greatly reduced cost and complexity, is the application of antireflective coatings to glass envelopes for solar energy collectors. It has been recognized that reflection losses from the envelope can substantially affect collector efficiency.

The reflection of light from a surface depends not only on the angle of incidence of the light, but also upon the refractive index of the material forming the surface. For glass, with an average refractive index of about 1.5, the reflectance from a single surface is about 4% for light impinging at incident angles of less than about 50° from the normal.

There presently exists a highly developed technology for producing antireflective coatings on optical surfaces. In general, the highest quality coatings are produced by vacuum deposition techniques. However, while such techniques are suitable for the batch treatment of small articles such as lenses, they are expensive and not readily adaptable to the continuous production of antireflective coatings on large articles. Particular difficulty is encountered in attempting to provide an antireflective coating on the surfaces of articles of complex shape, such as the interior walls of a glass envelope for a solar energy collection device.

It is not difficult to produce an antireflective film having zero reflectance in a narrow range of wavelengths. However, broad-band antireflective coatings generally consist of multiple layers, often as many as fifteen or more, in order to achieve low reflectance in both the visible and infrared spectral regions. Coatings having a graded refractive index appear to be effective in producing the desired broad-band antireflective properties.

It has long been known that the reflectance of glass surfaces could be reduced by etching techniques. Such etching can remove leachable components from the glass, leaving a skeletonized porous surface having a lower refractive index than the bulk glass. If etching is permitted to proceed only to an extent sufficient to provide a skeletonized surface layer of a depth approximating an odd multiple of one-fourth the wavelength of the light to be transmitted, then reduced reflectance of this light by the treated surface is observed.

Most of the known etching processes involve complex etching solutions and procedures which must be designed specifically for the type of glass composition to be treated. U.S. Pat. No. 2,348,704 to Adams, for example, describes a procedure for treating barium crown glass by removing the alkali, alkaline earth, and other bivalent metal oxides from the glass, and thereafter treating the glass with hydrofluoric acid to enlarge the pore structure of the residual siliceous layer.

U.S. Pats. Nos. 2,486,431 to Nicoll et al. and 2,490,662 to Thomsen describe methods for treating soda-lime glasses (e.g., window glasses) or optical crown glasses with complex, silica-saturated solutions of fluosilicic acid, in order to provide antireflective surface films thereon. However, these methods are not effective to produce efficient antireflective surface layers on borosilicate glasses.

As noted by L. Holland in *The Properties of Glass Surfaces*, Wiley & Sons, New York, (1964) on pages 155 and 165, acid etching processes do not typically produce good antireflective films on the surfaces of chemically-durable borosilicate glasses. Holland points out that the production of antireflecting films by chemical etching is presently deemed of little practical value in view of the weak and optically inefficient nature of the films so produced.

SUMMARY OF THE INVENTION

We have now discovered that excellent broad-band antireflective surface layers may be provided on chemically-durable borosilicate glasses by a process comprising a heating step in a specified temperature range followed by treatment with an aqueous treating solution containing a specified quantity of hydrogen and fluoride ions. Layers provided in accordance with the present invention exhibit antireflective properties superior to any prior art etched glass layers of which we are aware. Reflectances below 0.5% of incident light in the visible region and 2% of the incident light in the near infrared region up to and including 2 micron wavelengths may be readily provided on these chemically-durable glasses.

The use of a heat treatment in the production of antireflective surface layers on phase-separable alkali borosilicate glasses is broadly described by Minot et al. in a copending patent application Ser. No. 651,416, concurrently filed and commonly assigned herewith, and that application is expressly incorporated herein by reference for a further description of such treatments. The heat treatment of phase-separable alkali borosilicate glasses induces or further develops phase separation into silica-rich and silica-poor phases. As disclosed by Minot et al. in the aforementioned application, the phase separation in most of these glasses is of a nature and configuration such that the removal of the silica-poor phase from a surface layer of the glass leaves a residual siliceous layer having useful antireflective properties, particularly in the visible region of the spectrum.

The production of an antireflective surface having truly broad-band antireflective properties is thought to require a graded refractive index region, for example, a layer which has a very low refractive index at its outer surface and a refractive index approaching that of the substrate at the layer-substrate boundary. For some applications, such as solar collector envelopes, substantially reduced reflectance extending into the infrared as well as throughout the visible spectrum is desirable. Yet many prior art antireflective surfaces comprising siliceous layers exhibit nonreflectance primarily in the narrower visible region, just as do the well known homogeneous quarter-wavelength coatings.

DETAILED DESCRIPTION

Figure 1:
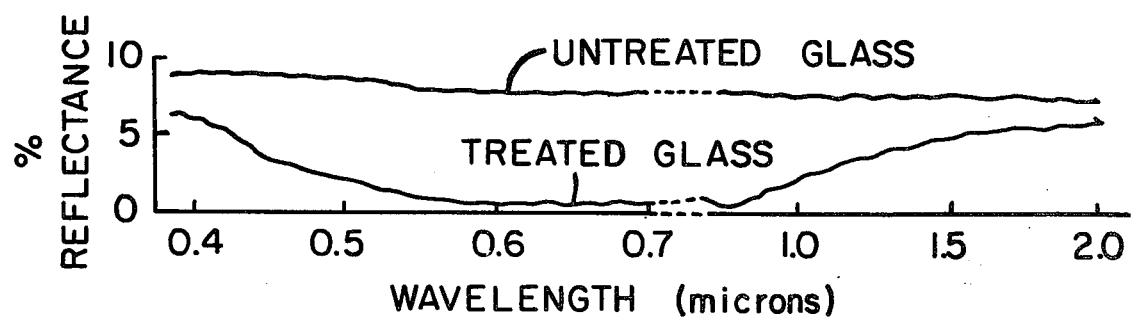
FIG. 1 of the drawing is a graph showing the percent reflectance of light from treated and untreated surfaces of a soda-lime-silica glass as a function of the wavelength of the reflected light. The treated soda-lime-silica glass was contacted with fluosilicic acid in accordance with a well known prior art process to provide a siliceous anti-reflective surface layer thereon. The low reflectance at 0.6–0.7 microns in the visible region of the spectrum is counterbalanced by substantial reflectance at 0.4 microns and in the 0.7–2.0 micron infrared wavelength range.

The production of antireflective surface layers on chemically-durable borosilicate glasses which exhibit very low reflectance both in the visible and in the near infrared requires the careful observation of limitations relating to both the heat treatment and subsequent chemical treatment of the glass.

Glasses suitable for treatment in accordance with the present invention are chemically-durable borosilicate glasses which are also phase-separable by heat treatment. These particularly include the very durable aluminoborosilicate glasses. Suitable compositions include, in weight percent on the oxide basis, about 72–82% $SiO_2$, 13–16% $B_2O_3$, 3–10% total of alkali metal oxides, and 0–4% $Al_2O_3$, these constituents constituting at least about 93% by weight of the glass. The alkali metal oxides may be selected from the group consisting of $Na_2O$, $K_2O$ and $Li_2O$.

Glasses containing less silica or more $B_2O_3$ or alkali than specified exhibit insufficient chemical durability for use in the invention, whereas glasses containing excessive $SiO_2$ and insufficient alkali and $B_2O_3$ do not exhibit the phase-separation characteristics required for the production of antireflective surface layers. The presence of $Al_2O_3$ in amounts ranging about 1–4% by weight is helpful in maintaining chemical durability. An example of a particularly suitable glass for the production of antireflective surface layers is Corning Code 7740 glass, commercially available from Corning Glass Works, Corning N.Y., 14830.

Chemical durability is a factor which is critical to the practical utility of antireflective layers for many important applications. In uses such as, for example, solar energy collector envelopes, the layers are subjected to weathering and contamination by the atmosphere. The porous nature of the layers makes them vulnerable to attack by water and chemicals. Glasses within the above-described composition region exhibit good chemical durability even after exposure to the phase-separation heat treatment, and the porous antireflection surface layers also exhibit good resistance to physical and chemical deterioration or contamination.

During the manufacture and/or heat treatment of the described borosilicate glasses, a glassy layer which is rich in silica is formed on surface portions of the glass. This layer retards extraction of the soluble phase formed in the glass on heat treatment, and is desirably removed prior to or during the removal of the soluble phase. Removal may be accomplished by any conventional means, including chemical or mechanical gringing or etching procedures. However, the preferred method is to chemically remove the silica by means of fluoride-containing solutions, for example, solutions containing HF or $NH_4F.HF$. Concentrated solutions of these fluoride compounds comprise the most convenient means of removal.

As disclosed in the aforementioned copending application of Minot et al., the soluble phase present in phase-separated borosilicate glasses can be removed by a variety of aqueous media, including pure water and any of a number of aqueous solutions of mineral acids. However we have discovered that solutions containing controlled concentrations of both hydrogen and fluoride ions must be utilized to treat highly-durable phase-separated glasses if broad-band antireflective surface layers are required. Neither hydrogen nor fluoride ions alone are effective to achieve this result. Moreover, excessive concentrations of these ions, such as are present in concentrated hydrofluoric acid solutions, can be totally ineffective to produce antireflective surface layers in certain of the more durable borosilicate glasses.

The necessary concentration of hydrogen ions in the aqueous treating solution may be obtained through the addition of any strong acid thereto. For the purpose of the present description a strong acid is one having a dissociation constant $K_a$ in excess of about $10^{-4}$ in aqueous solution at 25° C. Preferred acids are the strong mineral acids such as $HNO_3$, $H_3PO_4$, $H_2SO_4$, HCl and HF. The solution should have a hydrogen ion ($H^+$) normality (n) of at least about 0.02 gram equivalents per liter, wherein the ion normality is defined as:

$$n = \frac{\text{(grams of dissociable ion per liter of solution)}}{\text{(atomic weight of ion)}}$$

On the other hand, hydrogen ion normalities in excess of about 3.0 gram equivalents per liter are seldom required.

The necessary fluoride ion concentration in the aqueous treating solution can be obtained through the addition of dissociable fluorine compounds, e.g. hydrofluoric acid, thereto. Preferably, the source of these ions is a water soluble fluoride salt, such as $NH_4F$, $NH_4F.HF$, or another compound containing ionizable fluorine. A fluoride ion ($F^-$) normality (n) of at least about 0.02 gram equivalents per liter, n being defined as hereinabove described, is required to obtain sufficient ionic activity.

While any of the chemically-durable borosilicate glasses can serve as a substrate for the production of good antireflective layers, we have discovered that broad-band layers exhibiting exceptionally low reflectivity in the near infrared (wavelengths between 0.7–2.0 microns) can be provided on aluminoborosilicate glasses which are low in non-essential oxides such as PbO, $P_2O_5$, CaO, MgO, BaO and the like. Operative glasses for this purpose consist essentially, in weight percent on the oxide basis, of about 76–82% $SiO_2$, 13–15% $B_2O_3$, 4–6% $Na_2O$, and 1–4% $Al_2O_3$, these oxides constituting at least about 99% by weight of the glass.

The heat treatment of the above-described glass compositions must be carefully controlled in order to provide a phase separation which is useful for the production of broad-band antireflective layers. Insufficiently high temperatures may produce a phase separation which permits the removal of the soluble alkali- and boron-rich phase, but a porous layer exhibiting board-band antireflective properties will not be provided.

Glasses within the above-described composition region should be heat treated at a temperature in the range of about 630°–660° C. for a time in the range of about 1–10 hours, preferably about 1–4 hours, to obtain the separated phase characteristics required for exceptional antireflective properties. The phase separation process is both time and temperature dependent, so that a lower temperatures in the specified range, longer times should be employed.

Solutions containing high concentrations of hydrogen and fluoride ions, such as concentrated solutions of hydrofluoric acid, are not suitable for the removal of the soluble phase from the above-described aluminoborosilicate glasses to provide broad-band antireflective surface layers thereon. Although the aqueous treating solutions utilized for this purpose must contain the specified minimum concentrations of hydrogen and fluoride ions in order to be effective, solutions containing more than about 1.0 gram equivalent per liter of fluoride ion produce a surface layer having relatively poor antireflective properties on these glasses.

The most effective source of fluoride ions for aqueous treating solutions to be used with the preferred aluminoborosilicate glasses are the soluble fluoride salts $NH_4F$ and $NH_4F.HF$. These salts are preferably used in combination with the mineral acids to provide the desired hydrogen and fluoride ion normalties in aqueous treating solutions. Aqueous solutions of acids selected from the group consisting of $H_2SO_4$, HCl, $H_3PO_4$, or $NHO_3$, having a hydrogen ion concentration in the range of about 0.1–3.0 gram equivalents per liter, further containing at least one salt selected from the group consisting of $NH_4F$ and $NH_4F.HF$ in an amount in the range of about 0.1–1% by weight of the solution, are particularly preferred. As an alternate medium, a dilute aqueous HF solution containing 0.2–1.5% HF by weight may be employed.

In general the time of immersion in the aqueous treating solution is not critical in obtaining good antireflective properties in the surface layer produced. A minimum immersion interval, which may be as short as 5 seconds in some cases, is required to provide the porous layer. However, prolonged immersion, while producing continuous dissolution of the surface layer and underlying glass, ordinarily does not destroy the properties of the porous surface remaining at the termination of the treatment. Nevertheless, treatment times in excess of 1 hour are seldom required to provide optimum results, and are not considered to be of any practical benefit.

The invention may be further understood by reference to the following detailed examples, wherein one type of prior art film is compared with antireflective surface films provided on chemically-durable borosilicate glasses in accordance with the methods of the present invention.

Example I (Prior Art)

A typical prior art antireflective layer may be provided on a soda-lime-silica glass by treatment in a silica-rich fluosilicic acid solution in accordance with the following procedure. A fluosilicic acid treating solution is prepared by digesting several pieces of a soda-lime-silica glass in 16% (weight) fluosilicic acid at 45° C. until the solution is effective to provide a purple film on glass of the same composition (about 16 hours). All of the undigested glass is then removed from solution prior to treating fresh glass.

A small piece of soda-lime-silica glass of the digested composition is thoroughly cleaned by washing in a detergent solution, briefly etched in 0.5% (weight) HF, and rinsed in hot distilled water. The clean glass is the immersed for 100 minutes in a fluosilicic acid treating solution at 45° C. to provide the antireflective layer, removed from solution, and rinsed with distilled water.

Although the surface of a soda-lime-silica glass treated by this process exhibits less than 1% reflectance per surface at wavelengths near 0.65 microns, reflectences of over 2% at 0.4 microns and over 3% at 2.0 microns are also typical of these layers. Moreover, the layers typically exhibit very poor mechanical durability, being damaged or removed by simple rubbing.

FIG. 1 of the drawing consists of a graphical representation of reflectance as a function of wavelength for an untreated soda-lime-silica glass and an identical glass provided with antireflective surface layes produced in accordance with a procedure such as above described. The curve for the treated glass is believed to be typical of antireflective surface layers produced on soda-lime-silica glasses by these processes. Both curves show the percent reflectance by a glass sample (which includes two reflective surfaces) as a function of the wavelength of the incident light. While the reflectence of the treated glass is quite low at some wavelengths (e.g. 0.6 microns) in the visible range from 0.4–0.7 microns, it increases substantially at infrared wavelengths beyond about 0.8 microns, and reaches a value of about 6% (about 3% per surface) at 2.0 microns. The discontinuity in the curves at 0.7 microns arises from the fact that each curve is a composite of two shorter curves obtained by two different instruments.

Antireflective surface layers substantially better than the layers depicted in FIG. 1 in terms of broad-band (0.4–2.0 microns) antireflective capability may be provided in accordance with the following examples.

Example II

A section of glass tubing, having a composition, in weight percent, of about 79.1% $SiO_2$, 13.7% $B_2O_3$, 4.9% $Na_2O$, and 2.3% $Al_2O_3$, is selected for treatment. This section of tubing is heated in an electric furnace to a temperature of about 630° C., maintained at that temperature for 3 hours, cooled at a rate of 100° C. per hour to 450° C., and removed from the furnace.

The glass section, heat-treated as described, is etched for 20 minutes in 10% (weight) aqueous $NH_4F.HF$ to remove the high-silica surface layer present thereon. The glass is then immersed in a treating solution consisting of 0.6% (weight) of $NH_4F$ in aqueous 0.16 Normal $HNO_3$, containing 0.16 gram equivalents of $H^+$ and 0.16 gram equivalents of $F^-$ per liter of solution. Immersion is continued for 5 minutes at a solution temperature of 90° C.

Following treatment with this solution, the glass is removed, rinsed in distilled water, dried, and examined. An antireflective surface layer exhibiting a blue coloration in reflected light is observed. This surface layer exhibits a light reflectance not exceeding about 0.5% per surface over the entire wavelength range from 0.4–2.0 microns, including reflectances of less than 0.3% over the range from 0.4–0.7 microns, not exceeding about 0.1% over the range from 0.7–1.5 microns, and less than 0.5% at 2.0 microns.

Example III

Figure 2:
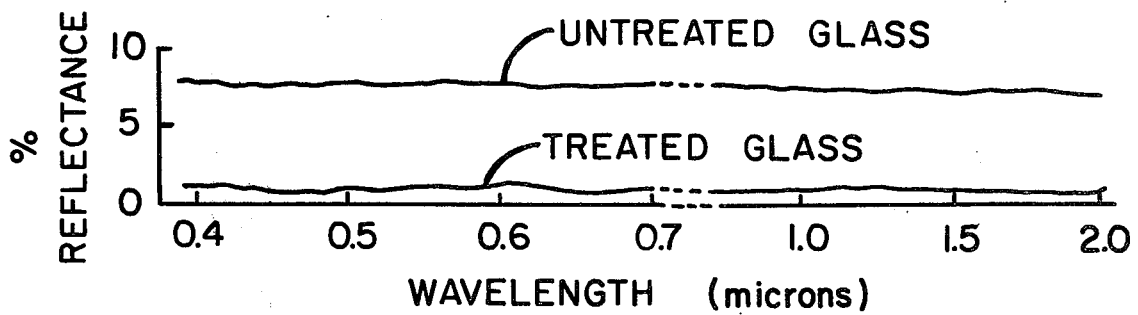
FIG. 2 of the drawing is a similar graph showing the percent reflectance of light from treated and untreated surfaces of a chemically-durable borosilicate glass, the treated glass being provided in accordance with the present invention. The graph shows the broad-band antireflective properties of a layer provided by out process, which layer is characterized by a slight reflectance not exceeding about 0.5% throughout the range of electromagnetic wavelengths from about 0.4–2.0 microns.

Equivalent results are obtained when glass sections of identical composition, heat treated as described above in Example II, are treated in a solution consisting of 0.4% (weight) of $NH_4F \cdot HF$ in aqueous 1 Normal $HNO_3$ (1.1 gram equivalent of $H^+$ and 0.14 gram equivalents of $F^-$ per liter of solution) for 10 minutes at a solution temperature of 90° C. The resulting antireflective surface layer, which exhibits an orange-purple coloration in reflected light, reflects not more than 0.5% of normally incident light at all wavelengths in the 0.4–2.0 micron range. FIG. 2 of the drawing consists of a graphical representation of reflectance as a function of wavelength for untreated aluminoborosilicate glass and for glass treated in accordance with the above procedure. The two curves show the percent reflectance by the glass samples (each sample including two reflective surfaces) as a function of the wavelength of the incident light. The percent reflectance for the treated glass sample does not exceed about 1% (about 0.5% per surface) throughout the visible range of 0.4–0.7 microns, and maintains at least this value even at wavelenths as great as 2.0 microns.

Example IV

A section of glass tubing having the composition of the tubing treated in Example II above is treated in an electric furnace to a temperature of 630° C., maintained at 630° C. for 3 hours, cooled at a rate of about 100° C. per hour to 450° C. and finally removed from the furnace.

The glass section heat treated as described is etched for 30 minutes in 10% (weight) aqueous $NH_4F \cdot HF$ and thereafter immersed in a treating solution consisting of about 0.15% (weight) of $NH_4F \cdot HF$ in aqueous 0.16 Normal $NHO_3$, containing 0.19 equivalents of $H^+$ and 0.052 gram equivalents of $F^-$ ion per liter of solution. Immersion in this solution is continued for 15 minutes at a solution temperature of 45° C.

Following immersion, the section is removed from solution, rinsed in distilled water, dried, and examined.

The antireflective surface layer resulting from the above treatment exhibits a purple coloration in reflected light, and exhibits a reflectance not exceeding 1.5% per surface for all wavelengths in the 0.4–2.0 micron range.

Example V

A section of glass tubing having the composition of the tubing treated in Example II above is heated in an electric furnace to 630° C., maintained at 630° C., for 3 hours, cooled at a rate of 100° C., per hour to 450° C., and removed from the furnace.

The glass section heat treated as described is etched for 20 minutes in 10% (weight) aqueous $NH_4F \cdot HF$ and then immersed in a treating solution consisting of 1% (weight) HF in water, containing 0.5 gram equivalents of $H^+$ and 0.5 gram equivalents of $F^-$ per liter of solution. Immersion is continued for 5 minutes at a solution temperature of 90° C.

Following immersion the glass is removed from solution, washed in distilled water, dried, and examined. An antireflective surface layer exhibiting a purple coloration in reflected light and a reflectance not exceeding about 0.5% per surface at wavelengths in the 0.4–2.0 micron range is present.

Other solutions which may be employed in providing good antireflective surface layers on durable aluminoborosilicate glasses such as treated in Examples II–V above are set forth in Table 1 below. Included in Table 1 are the compositions of the solutions and the hydrogen and fluoride normality thereof. Fluoride compound concentrations are reported in weight percent of the solution.

TABLE 1

| Treating Solution | Hydrogen Normality (gram equivalents/1) | Fluoride Normality (gram equivalents/1) |
|---|---|---|
| 1. 0.05% $NH_4F \cdot HF$ by weight in 0.16 Normal $HNO_3$ | 0.17 | 0.02 |
| 2. 1.0% $NH_4F \cdot HF$ by weight in 1.5 Normal $HNO_3$ | 1.7 | 0.35 |
| 3. 1.0% $NH_4F$ by weight in 0.16 Normal $HNO_3$ | 0.16 | 0.27 |
| 4. 0.2% HF by weight in $H_2O$ | 0.10 | 0.10 |

Although a variety of other solutions containing both hydrogen and fluoride ions may be utilized to provide layers in accordance with the invention, we have been unable to provide a good broad-band antireflective surfaces by treatment with either mineral acids or neutral fluoride compounds alone. Although treatment of the phase-separated glass with mineral acids such as $HNO_3$ can be effective to remove the soluble phase, the resulting surfaces are hazy due to crystallite formation, and scattering and reduced light transmittance are observed. Sequential treatment with hydrfluoric acid did not improve surface quality but resulted only in a frosted surface layer. In contrast to the above results, layers provided in accordance with the present invention exhibit high light transmittance with essentially no absorption or scattering losses.

In treating durable boroaluminosilicate glasses such as utilized in Examples II–V above, failure to observe the maximum fluoride limitation can produce a layer of markedly reduced efficiency, or no layer at all. Hence we have been unable to reproducibly provide good broad-band antireflective layers on these glasses utilizing acidified treating solutions containing, for example, additions of as much as about 2% (weight) HF, 5% (weight) $NH_4F \cdot HF$, or 10% (weight) $NH_4F$.

Similarly the use of phase separation heat treatments at temperatures outside the prescribed range for these glasses typically produces a layer having narrower antireflective characteristics. The importance of phase separation heat treatment on the antireflective properties of the surface in the infrared regions of the spectrum is illustrated by the data set forth in Table 2 below. Several samples of an aluminoborosilicate glass of the composition treated in Examples II–V above were heat treated at temperatures of 600° or 630° C. for 3 hours and then treated for specified intervals with solutions containing $H^+$ and $F^-$ ions to obtain antireflective surface layers thereon. The resultant layers were then tested for their antireflective properties at 1.0, 1.5 and 2.0 microns. Included in Table 2 are the temperature and time of the phase separation heat treatment, the solution utilized to provide the antireflective surface layer on each glass, the time of treatment in the specified solution, and the resulting reflectance of the treated glass surfaces at 1.0, 1.5 and 2.0 microns, expressed as a percent reflectance per surface.

TABLE 2

| Heat Treatment (° C-hours) | Treating Solution | Treating Time | Measured Reflectance (% per surface) | | |
|---|---|---|---|---|---|
| | | | 1.0 microns | 1.5 microns | 2.0 microns |
| 600° C. - 3 hours | 0.4 wt.% $NH_4F \cdot HF$ in 1N $HNO_3$ | 5 minutes | 1.9% | 2.7% | 3.0% |
| 600° C. - 3 hours | 0.4 wt.% $NH_4F \cdot HF$ in 1N $HNO_3$ | 10 minutes | 1.5% | 2.4% | 2.8% |
| 600° C. - 3 hours | 0.2 wt.% $NH_4F$ in 1N $HNO_3$ | 4 minutes | 0.3% | 1.5% | 2.1% |
| 630° C. - 3 hours | 0.4 wt.% $NH_4F \cdot HF$ in 1N $HNO_3$ | 5 minutes | 0.3% | 0.1% | 0.6% |
| 630° C. - 3 hours | 0.4 wt.% $NH_4F \cdot HF$ in 1N $HNO_3$ | 10 minutes | 0.3% | 0.1% | 0.2% |
| 630° C. - 3 hours | 0.2 wt.% $NH_4F$ in 1N $HNO_3$ | 4 minutes | 0.2% | 1.2% | 2.0% |

Thus, aluminoborosilicate glasses phase separated at 600° C. tend to exhibit near infrared reflectances higher than glass phase separated at 630° C., typically on the order of 2–3% at 2.0 micron wavelengths. On the other hand, through adherence to the prescribed process limitations of the present invention, an antireflective surface layer having a reflectance of less than 0.5% per surface in the visible range of about 0.4–0.7 microns and not more than 2% per surface at all wavelengths from 0.7 out to an including 2.0 microns may readily be provided.

While the thickness and microstructure of antireflective surface layers provided in accordance with the invention are not fully known, available evidence suggests that the layers are predominantly porous silica, having pore sizes in the range of about 800–2000A. The layers have an apparent thickness in the range of about 1000–10,000A. and exhibit antireflective characteristics such as would be provided by a graded-refractive-index layer. Thus a porous surface layer having a graded refractive index is apparently responsible for the broad-band antireflective characteristics observed.

We claim:

1. A process for providing a glass article having a porous broad-band antireflective surface layer exhibiting a reflectance not exceeding about 2% at all wavelengths in the 0.4–2.0 micron range consisting of the steps of:
    a. selecting a borosilicate glass article composed of a glass having an oxide composition, in weight percent, of about 72–82% $SiO_2$, 13–16% $B_2O_3$, 3–10% total of alkali metal oxides selected from the group consisting of $Na_2O$, $K_2O$ and $Li_2O$, and 0–4% $Al_2O_3$, these oxides making up at least about 93% by weight of the glass;
    b. heating the borosilicate glass article to a temperature in the range of 630°–660° C. for a time in the range of about 1–10 hours to develop phase separation therein and producing a non porous surface; and thereafter
    c. contacting the nonporous surface of the borosilicate glass article with an aqueous treating solution containing both hydrogen and fluoride ions, said solution having a hydrogen ion normality of at least about 0.02 gram equivalents per liter and a fluoride ion normality of at least about 0.02 gram equivalents per liter, for a time at least sufficient to produce a porous antireflective surface layer on said article.

2. A process according to claim 1 wherein the borosilicate glass article has an oxide composition, in weight percent, of about 76–82% $SiO_2$, 13–15% $B_2O_3$, 4–6% $Na_2O$, and 1–4% $Al_2O_3$, these oxides making up at least 99% by weight of the glass.

3. A process according to claim 2 wherein the glass article is heated at a temperature in the range of about 630°–660° C. for a time in the range of about 1–4 hours.

4. A process according to claim 3 wherein the fluoride ion normality of the aqueous treating solution does not exceed about 1.0 gram equivalent per liter of solution.

5. A process according to claim 4 wherein the aqueous treating solution contains at least one acid selected from the group consisting of $H_2SO_4$, HCl, $H_3PO_4$, and $HNO_3$, and has a hydrogen ion concentration in the range of about 0.1–3 gram equivalents per liter.

6. In the method of forming a porous antireflective surface layer on a glass article composed of a phase-separable glass consisting of the steps of heating the glass article to obtain a phase separation therein into silica-rich and silica-poor phases, and thereafter contacting the glass article with a treating solution for a time sufficient to leach from a surface layer of the article the silica-poor phase, leaving the silica-rich phase remaining as an antireflective surface layer thereon, the improvement whereby a broad-band antireflective surface layer exhibiting a reflectance not exceeding 0.5% in the 0.4–0.7 micron wavelength range and not exceeding 2% in the 0.7–2.0 micron wavelength range is provided consisting of the steps of:
    a. selecting for treatment a durable borosilicate glass article having an oxide composition, in weight percent, of about 76–82% $SiO_2$, 13–15% $B_2O_3$, 4–6% $Na_2O$, and 1–4% $Al_2O_3$, these oxides making up at least about 99% by weight of the glass;
    b. heating the borosilicate glass article to a temperature in the range of about 630°–660° C. for a time in the range of about 1–4 hours to develop phase separation therein and producing a non porous surface; and
    c. contacting the nonporous surface of the borosilicate glass article with an aqueous solution containing both hydrogen and fluoride ions, wherein the hydrogen ion normality is in the range of about 0.02–3.0 gram equivalents per liter and the fluoride ion normality is in the range of about 0.02–1.0 gram equivalents per liter, for a time interval in the range of about 5 seconds to 1 hour;
thus to provide a broad-band antireflective surface layer on the glass article.

* * * * *

UNITED STATES PATENT AND TRADEMARK OFFICE
CERTIFICATE OF CORRECTION

PATENT NO. : 4,019,884
DATED : April 26, 1977
INVENTOR(S) : Thomas H. Elmer and Helen V. Walters It is certified that error appears in the above-identified patent and that said Letters Patent are hereby corrected as shown below:

Column 3, line 21, "out" should be -- our --.

Column 3, line 22, "slight" should be -- light --.

Column 4, line 8, "gring-" should be -- grind- --.

Column 5, line 20, "a" should be -- at --.

Column 5, line 42, "$NHO_3$" should be -- $HNO_3$ --.

Column 6, line 16, "the" should be -- then --.

Column 6, line 23, "ences" should be -- ances --.

Column 6, line 30, "layes" should be -- layers --.

Column 6, line 37, "reflectence" should be -- reflectance --.

Column 7, line 38, "treated" should be -- heated --.

Column 7, line 47, "$NHO_3$" should be -- $HNO_3$ --.

Signed and Sealed this twenty-third Day of August 1977

[SEAL]

Attest:

RUTH C. MASON
*Attesting Officer*

C. MARSHALL DANN
*Commissioner of Patents and Trademarks*